(12) United States Patent
Helline

(10) Patent No.: US 11,097,648 B2
(45) Date of Patent: Aug. 24, 2021

(54) METHOD AND APPARATUS FOR OPERATING TRAILER JACKS

(71) Applicant: Steven M. Helline, Massillon, OH (US)

(72) Inventor: Steven M. Helline, Massillon, OH (US)

(73) Assignee: KELLYSRT, LLC, Canal Fulton, OH (US)

( * ) Notice: Subject to any disclaimer, the term of this patent is extended or adjusted under 35 U.S.C. 154(b) by 305 days.

(21) Appl. No.: 16/272,446

(22) Filed: Feb. 11, 2019

(65) Prior Publication Data
US 2020/0254919 A1 Aug. 13, 2020

(51) Int. Cl.
| | |
|---|---|
| *B60P 7/08* | (2006.01) |
| *B25B 13/06* | (2006.01) |
| *B25B 13/48* | (2006.01) |
| *F16H 57/021* | (2012.01) |
| *F16H 57/039* | (2012.01) |

(52) U.S. Cl.
CPC ............ *B60P 7/0853* (2013.01); *B25B 13/06* (2013.01); *B25B 13/48* (2013.01); *B60P 7/0838* (2013.01); *F16H 57/039* (2013.01); *F16H 2057/0213* (2013.01)

(58) Field of Classification Search
CPC ...... B60P 7/0853; B60P 7/0838; B25B 13/06; B25B 13/48
USPC ........................................................ 410/103
See application file for complete search history.

(56) References Cited

U.S. PATENT DOCUMENTS

| | | | |
|---|---|---|---|
| 3,065,007 A | 11/1962 | Colmer, Jr. | |
| 5,626,062 A * | 5/1997 | Colvin | B25B 13/06 81/177.85 |
| 7,192,009 B2 * | 3/2007 | Massey | B66D 3/12 254/216 |
| 9,089,957 B2 * | 7/2015 | Chen | B25B 13/465 |
| 9,393,936 B1 * | 7/2016 | Grote | B60S 9/08 |
| 10,335,928 B2 * | 7/2019 | Wang | B25B 13/00 |
| 2014/0109361 A1 | 4/2014 | Helline | |
| 2016/0046228 A1 * | 2/2016 | Williams | B60P 7/0853 410/98 |
| 2016/0193982 A1 * | 7/2016 | Wu | B60P 7/083 242/395 |
| 2016/0271760 A1 * | 9/2016 | Hu | B25B 13/56 |
| 2017/0001603 A1 * | 1/2017 | Chen | B60S 9/08 |
| 2017/0173767 A1 * | 6/2017 | Chuang | B25B 13/48 |
| 2017/0355298 A1 | 12/2017 | Cahall | |

(Continued)

*Primary Examiner* — Hilary L Gutman
(74) *Attorney, Agent, or Firm* — Sand, Sebolt & Wernow Co., LPA

(57) ABSTRACT

An apparatus to lower or raise landing gear on a trailer or semi-truck comprising a tool having a center body with a coupling device and a power coupling that is selectively engageable with a rotatable projection on the landing gear. The power coupling is operatively engaged with a worm gear within the center body and thereby with the coupling device. A powered drill is engaged with the power coupling and is actuated to rotate the power coupling in a first direction or in a second direction. The power coupling rotates the worm gear, which rotates the coupling device and thereby the projection on the landing gear. Rotation of the projection in one direction lowers the landing gear. Rotation of the projection in the opposite direction raises the landing gear. The user selects to raise or lower the landing gear simply by causing the drill chuck to rotate clockwise or counter-clockwise.

19 Claims, 10 Drawing Sheets

(56) References Cited

U.S. PATENT DOCUMENTS

2018/0251063 A1\* 9/2018 Helline ................ B60P 7/0853
2019/0232467 A1\* 8/2019 Su ........................ B25B 13/463

\* cited by examiner

METHOD AND APPARATUS FOR OPERATING TRAILER JACKS

TECHNICAL FIELD

Generally, the current disclosure relates to a tool and a method for raising and lowering landing gear for trailers and semi-trucks. Specifically, the current disclosure relates to an apparatus that incorporates a center body, a coupling device, and a power coupling. The coupling device is engaged with the landing gear and the power coupling of the tool is selectively engaged by way of an external power source and caused to rotate. Rotation of the power coupling causes rotation of the coupling device and results in the landing gear being selectively lowered or raised.

BACKGROUND

Background Information

Vehicle trailers, for example, boat trailers, horse trailers, recreational house trailers, and other types of trailers that are towed by trucks, are typically connected to the trucks by a releasable coupling. Such releasable coupling include couplings such as gooseneck couplings or fifth wheel couplings. When the trailer is subsequently released from the truck and the forward end of the trailer is no longer supported by the truck, a landing gear assembly is often used to support the trailer floor or bed in a generally horizontal position. The landing gear assembly may take a variety of different configurations that may generally be referred to herein using either of the terms "landing gear" or "trailer jack".

A typical landing gear assembly is attached to the trailer proximate the trailer's front end and adjacent the truck coupling. When the trailer is to be towed, the landing gear is moved to a retracted position so that the landing gear does not and cannot contact the ground. When the landing gear is going to be needed to support the trailer, the landing gear is moved to an extended position so that a portion thereof rests upon the ground and helps support the weight of the trailer. It will be understood that in some examples more than one landing gear may be provided on a trailer.

In some examples, the landing gear includes a vertical leg mounted on a column. A gear mechanism on the column may be selectively operated to lower the leg relative to the column until the end of the leg contacts the ground or to raise the leg relative to the column and out of contact with the ground. Traditionally, a hand crank may be connected to a projection or shaft assembly that is linked to the gear mechanism within the trailer jack. The operator can rotate the hand crank engaged with the projection or shaft assembly in a first direction to lower the leg and in a second direction to raise the leg.

A typical hand crank may be engaged with the shaft of the landing gear assembly by a pivot connection. The pivot connection may enable the hand crank to be pivoted outwardly from a side of the trailer to an operative position. In the operative position there is ample clearance from a side of the trailer to rotate the crank. When the trailer is to be towed, the pivot connection enables the hand crank to be pivoted beneath the landing gear assembly to a storage position where the crank is not projecting outwardly from the side of the trailer.

However, using a hand crank to raise or lower landing gear is time consuming and involves much involve physical exertion on the part of the user.

SUMMARY

The tool and method disclosed herein provide a quick and easy way to raise and lower landing gear on trailers and semi-trucks that require considerably less physical exertion on the part of the user.

An apparatus to lower or raise landing gear on a trailer or semi-truck comprising a tool having a center body with a coupling device and a power coupling that is selectively engageable with a rotatable projection on the landing gear. The power coupling is operatively engaged with a worm gear within the center body and thereby with the coupling device. A powered drill is engaged with the power coupling and is actuated to rotate the power coupling in a first direction or in a second direction. The power coupling rotates the worm gear, which rotates the coupling device and thereby the projection on the landing gear. Rotation of the projection in one direction lowers the landing gear. Rotation of the projection in the opposite direction raises the landing gear. The user selects to raise or lower the landing gear simply by causing the drill chuck to rotate clockwise or counter-clockwise.

In one aspect, the present disclosure may provide for an apparatus for lowering and raising a landing gear on a truck or trailer comprising, a center body, a coupling device extending outwardly from a front side of the center body; said coupling device being adapted to engage a projection on a landing gear; and a power coupling provided on the center body, said power coupling being operatively engaged with the coupling device, wherein the power coupling is adapted to couple to an external power source; and wherein operation of the power source rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear. This exemplary embodiment or another exemplary embodiment may further provide for the power coupling to comprise a shaft having a head at one end; and wherein the head is adapted to be engaged by the external power source. This exemplary embodiment or another exemplary embodiment may further provide for a worm provided on the shaft. This exemplary embodiment or another exemplary embodiment may further provide for the center body to define a central through-hole; and the worm is located in the central through-hole. This exemplary embodiment or another exemplary embodiment may further provide for the center body to define an opening that extends from an exterior surface of the center body to the central through-hole; and wherein the shaft extends through the opening and into the worm disposed in the central through-hole; and wherein the head is located adjacent the exterior surface of the center body. This exemplary embodiment or another exemplary embodiment may further provide for a worm wheel on the center body; said worm wheel being operatively engaged with the worm; and wherein rotation of the worm causes rotation of the worm wheel. This exemplary embodiment or another exemplary embodiment may further provide for the worm wheel to be operatively engaged with the coupling device and rotation of the worm wheel causes rotation of the coupling device. This exemplary embodiment or another exemplary embodiment may further provide for the coupling device to be rotated in unison with the worm wheel. This exemplary embodiment or another exemplary embodiment may further provide for a locking aperture defined on the center body, said locking aperture being adapted to engage a locking mechanism on the landing gear; and when the locking aperture is engaged with the locking mechanism, the center body is locked in position relative to the landing gear. This exemplary embodiment or another exemplary embodiment may further provide for the coupling device to be a tubular member having a peripheral wall that bounds and defines a bore; and wherein the bore is adapted to receive the projection from the landing gear therein. This exemplary embodiment or another exemplary embodiment may further provide for the peripheral wall to define a pair of opposed apertures therein and the pair of apertures is in communication with the bore; and wherein the apparatus further comprises a locking pin that is receivable through the pair of apertures and is adapted to further be received through aligned openings defined in the projection extending from the landing gear and thereby secure the coupling device to the projection.

In another aspect, the present disclosure may provide for in combination, a hand-held drill; and an apparatus for lowering and raising a landing gear on a truck or trailer, wherein the apparatus comprises: a center body, a coupling device extending outwardly from a front side of the center body; said coupling device being adapted to engage a projection on a landing gear; and a power coupling provided on the center body, said power coupling being operatively engaged with the coupling device; wherein the power coupling is coupled to the hand-held drill; and wherein operation of the drill rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear. This exemplary embodiment or another exemplary embodiment may further provide for the hand-held drill including a socket driver that is selectively engaged with the power coupling. This exemplary embodiment or another exemplary embodiment may further provide for a locking aperture defined on the center body, said locking aperture being adapted to engage a locking mechanism on the landing gear; and when the locking aperture is engaged with the locking mechanism and the hand-held drill is operated, the center body is locked in position relative to the landing gear.

In yet another aspect, the present disclosure may provide for a method of raising and lowering a trailer or semi-truck landing gear said method comprising steps of: providing a tool having a center body, a coupling device extending from the center body, and a power coupling provided on the center body; attaching the coupling device to a projection on a trailer landing gear; engaging the power coupling to an external power source; actuating the external power source; rotating the power coupling in one of a first direction and a second direction; rotating the coupling device in response to rotating the power coupling; and lowering the landing gear when the power coupling is rotated in the first direction and raising the landing gear when the power coupling is rotated in the second direction. This exemplary embodiment or another exemplary embodiment may further provide for locking the center body to a portion of the landing gear; and preventing rotation of the center body relative to the portion of the landing gear while rotating the power coupling in the one of the first direction and the second direction. This exemplary embodiment or another exemplary embodiment may further provide for the step of locking comprising: engaging a locking mechanism on the landing gear in a locking aperture located provided on the center body. This exemplary embodiment or another exemplary embodiment may further provide for the step of engaging the locking mechanism further comprising: inserting a first end of a spring-loaded arm of the locking mechanism through the locking aperture. This exemplary embodiment or another exemplary embodiment may further provide for the steps of engaging the power coupling to the external power source and actuating the power source further comprising: engaging a socket on the external power source about a head of a shaft of the power coupling; engaging a worm located in the center body about the shaft of the power coupling; rotating the shaft of the power coupling with the socket; and rotating the worm in unison with the shaft. This exemplary embodiment or another exemplary embodiment may further provide for engaging the worm with a worm wheel located within the center body; and rotating the worm wheel in response to rotation of the worm; and rotating the coupling device in response to rotation of the worm wheel.

In some embodiments, the apparatus may be referred to as a trailer jack or landing gear, both terms may be used interchangeably within the specification as provided.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A new tool and method of operation thereof is depicted in the present disclosure and throughout FIGS. 1-9. Tool 18 is a new and improved apparatus that may be used to raise and lower the landing gear of various trailer jacks relatively quickly and easily, and without much physical effort on the part of the user, as will be discussed hereafter.

Figure 1:
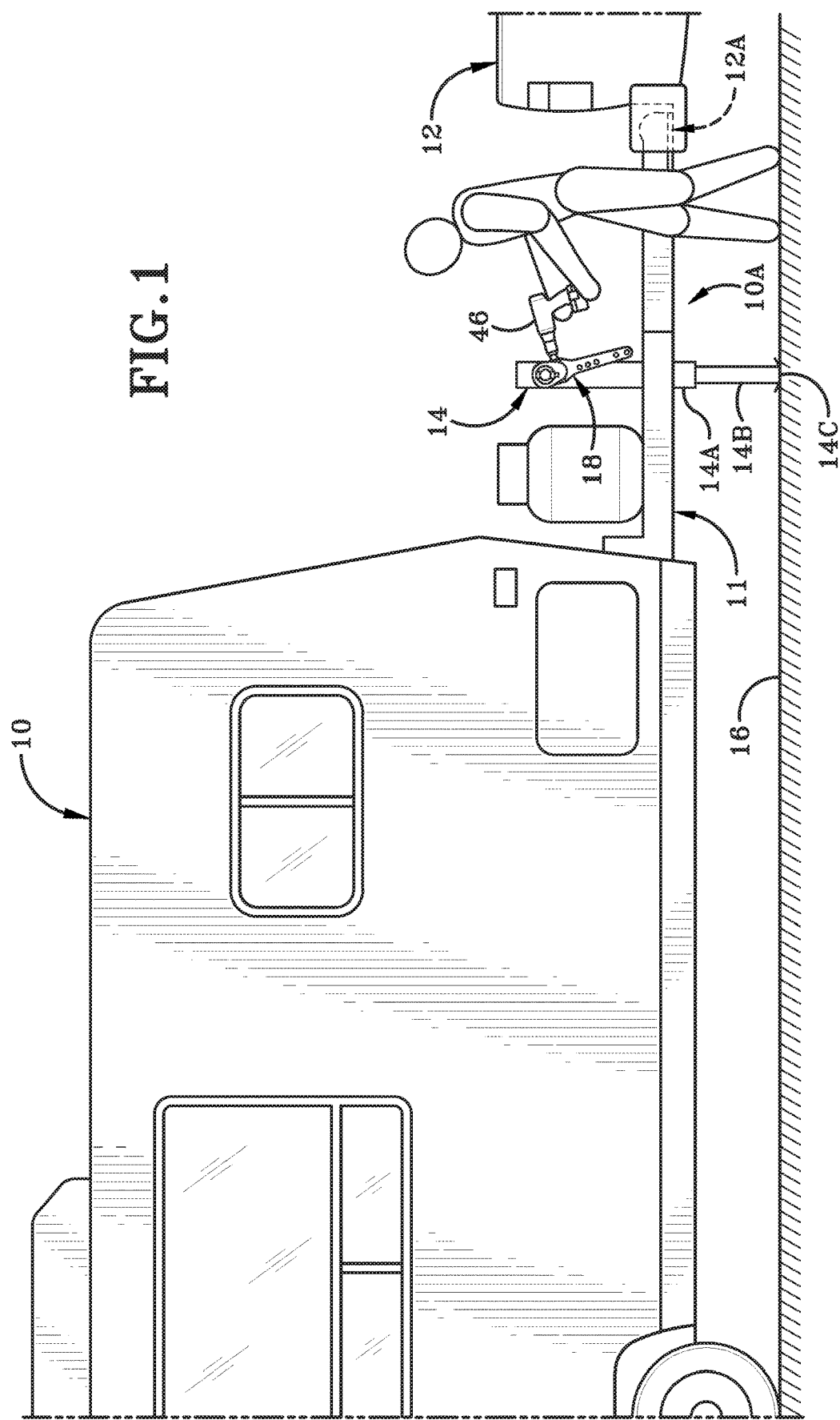
FIG. 1 is a diagrammatic front elevation view showing a tool in accordance with an aspect of the present disclosure engaged with a landing gear on a trailer for a camper.

Referring to FIG. 1, there is shown a trailer 10 which includes a frame 11 attached to a vehicle 12. The trailer 10 has a front end 10A that is operatively engaged with a hitch 12A on the vehicle 12. The trailer includes a trailer jack 14 that is comprised of a body 14A and a leg 14B. The body 14A is mounted on the trailer 10 and the leg 14B is selectively extendable and retractable out of the body 14A. The body 14A may be fixedly mounted on trailer 10 in a set orientation. In other examples, body 14A may be pivotally mounted on trailer 10 and may be pivoted between a horizontal storage position and a vertical use position.

When it is desired to remove the trailer 10 from the hitch 12A and the trailer jack 14 is required to support front end 10A of trailer 10, the leg 14B is extended further out of the body 14A so that a foot 14C thereon contacts the ground surface 16. Hitch 12A may then be disengaged from front end 10A and the weight of front end 10A of trailer 10 will be supported by trailer jack 14. When it is desired to tow the trailer 10, the hitch 12A is engaged with front end 10A of trailer 10 and the leg 14B of trailer jack 14 is retracted inwardly into the body 14A so that the foot 14C no longer contacts the ground surface 16.

Trailer jack 14 includes a projection 14D (typically some type of nut or sleeve) that is operatively engaged with the mechanism that moves leg 14B relative to body 14A. In the past, a hand crank might have been engaged with projection 14D in order to extend leg 14B outwardly from body 14A or to retract leg 14B inwardly toward body 14A. In the past, a user would rotate the hand crank and thereby the projection 14D in a first direction to lower leg 14B relative to body 14 and so that foot 14C would be moved into contact with ground surface 16. In the past, a user would rotate the hand crank and thereby the projection 14D in a second direction to raise leg 14B relative to body 14A and foot 14C would thereby be with withdrawn from ground surface 16.

In order to effectuate motion of the leg 14B in or out of body 14A and thereby toward or away from the ground surface 16, a user may engage a tool 18 in accordance with the present disclosure with trailer jack 14 and then operate trailer jack 14 with tool 18. In particular, the user may engage tool 18 with projection 14D on trailer jack 14 and then utilize tool 18 to rotate projection 14D in one of a first direction and a second direction. When tool 18 rotates projection 14D in the first direction, leg 14B is lowered out of body 14A and this motion may be continued until foot 14C contacts ground surface 16. When tool 18 rotates projection 14D in the second direction, leg 14B is raised toward body 14A and this motion may be continued until foot 14C breaks contact with ground surface 16. Tool 18 and its operation will be further described in detail hereafter.

Referring now to FIGS. 2 to 5, an exemplary tool 18 is shown in a front perspective view. Tool 18 has a center body 20 that has a front side 20A, a back side 20B, a top 20C, a bottom 20D a first side 20E and a second side 20F. Center body 20 may be generally keyhole-shaped when viewed from the front or back, such as in FIG. 2. Center body 20 includes a head 22, a neck 23, and a lever arm 24 and is configured such that neck 23 is located between head 22 and lever arm 24, and lever arm 24 extends downwardly and outwardly from neck 23. Head 22 has a width, measured from first side 20E to second side 20F and the width is greater than a width of neck 23 or a width of lever arm 24. Neck 23 tapers in width from head 22 to lever arm 24.

Figure 2:
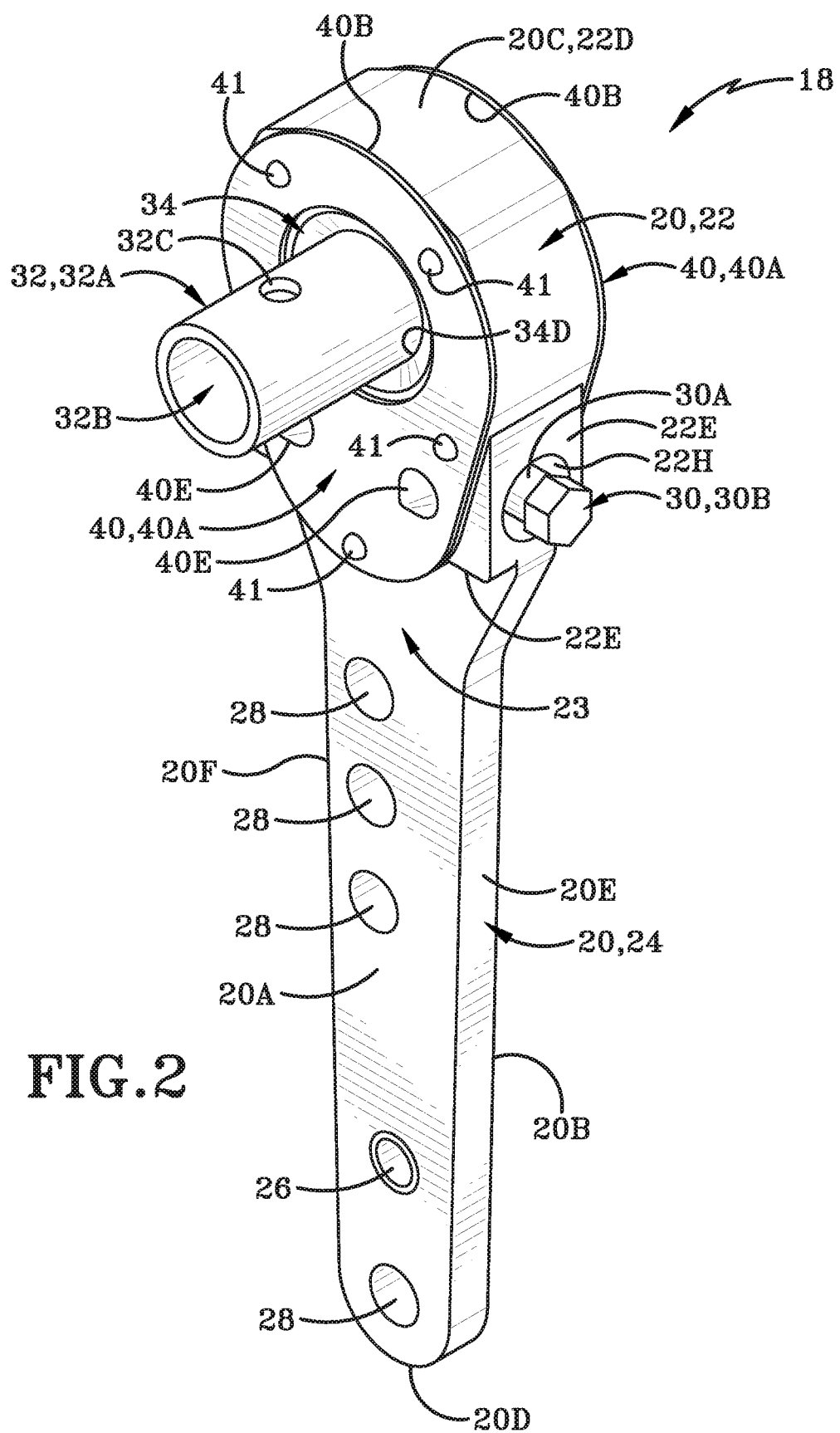
FIG. 2 is a front perspective view of the exemplary tool of FIG. 1 shown on its own.
Figure 6:
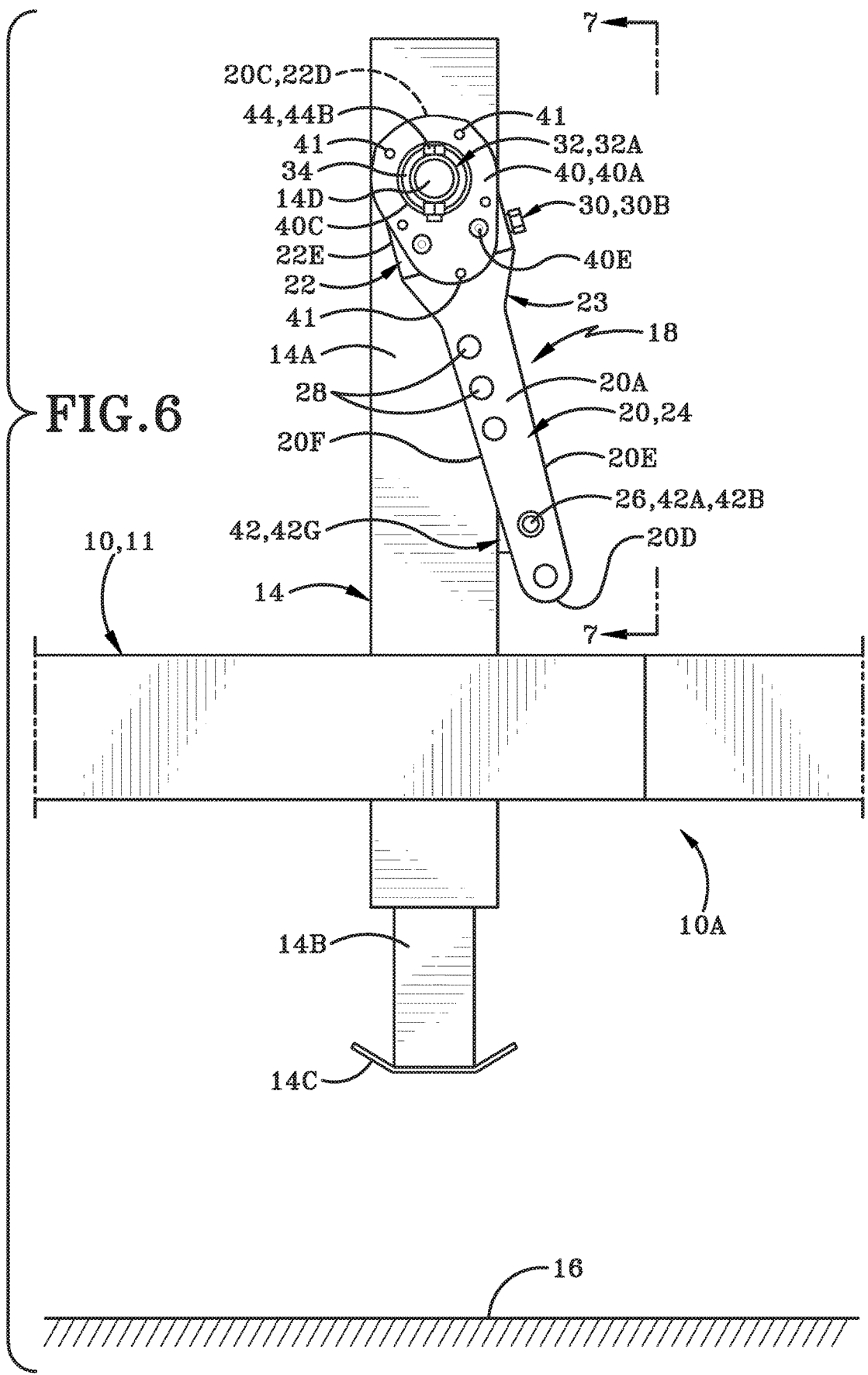
FIG. 6 is a front elevation view of the tool shown engaged with a body of a trailer jack.
Figure 7:
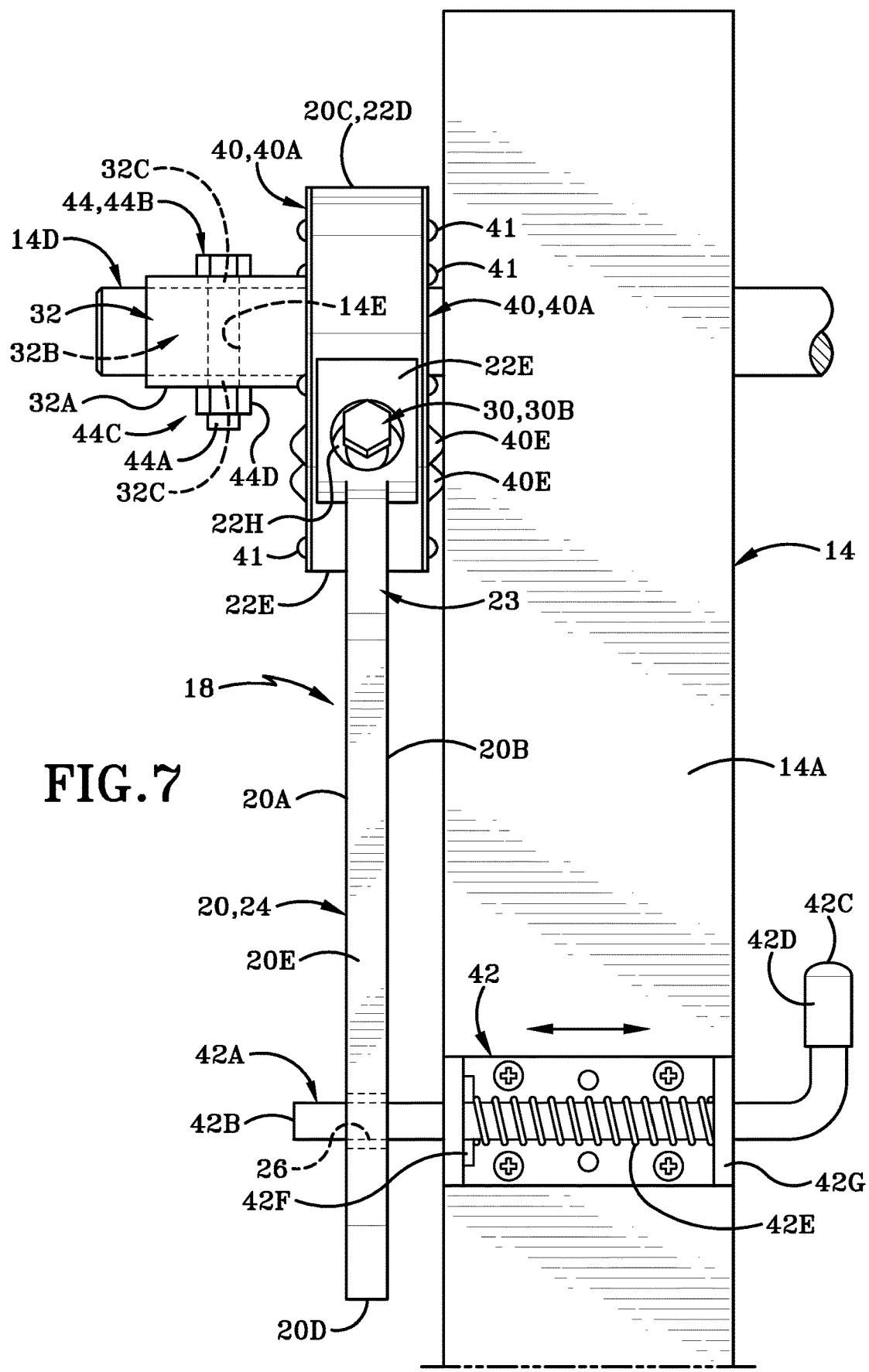
FIG. 7 is side elevation view of the tool shown engaged with the body of the trailer jack taken along line 7-7 of FIG. 6.

Lever arm 24 may be generally wedge-shaped when tool 18 is seen from the front as is illustrated in FIG. 2 and FIG. 7. Lever arm 24 may taper in width from proximate the bottom end of head 22 to bottom or tip 20D of center body 20. The bottom or tip 20D may be gently rounded. In an exemplary embodiment, lever arm 24 defines a locking aperture 26 (shown in FIGS. 6 and 7) that may be utilized to lock tool 18 to a trailer jack 14. Lever arm 24 may also define a plurality of optional weight reducing holes 28 therein. Each of the locking aperture 26 and holes 28 extends from front side 20A through to back side 20B of lever arm 24. In an alternative embodiment, each of the front surface 20A, back surface 20B, first side surface 20E and second side surface 20F of lever arm 24 may be substantially continuous and unbroken, being free of any aperture or holes through which other components may be selectively inserted.

Figure 3:
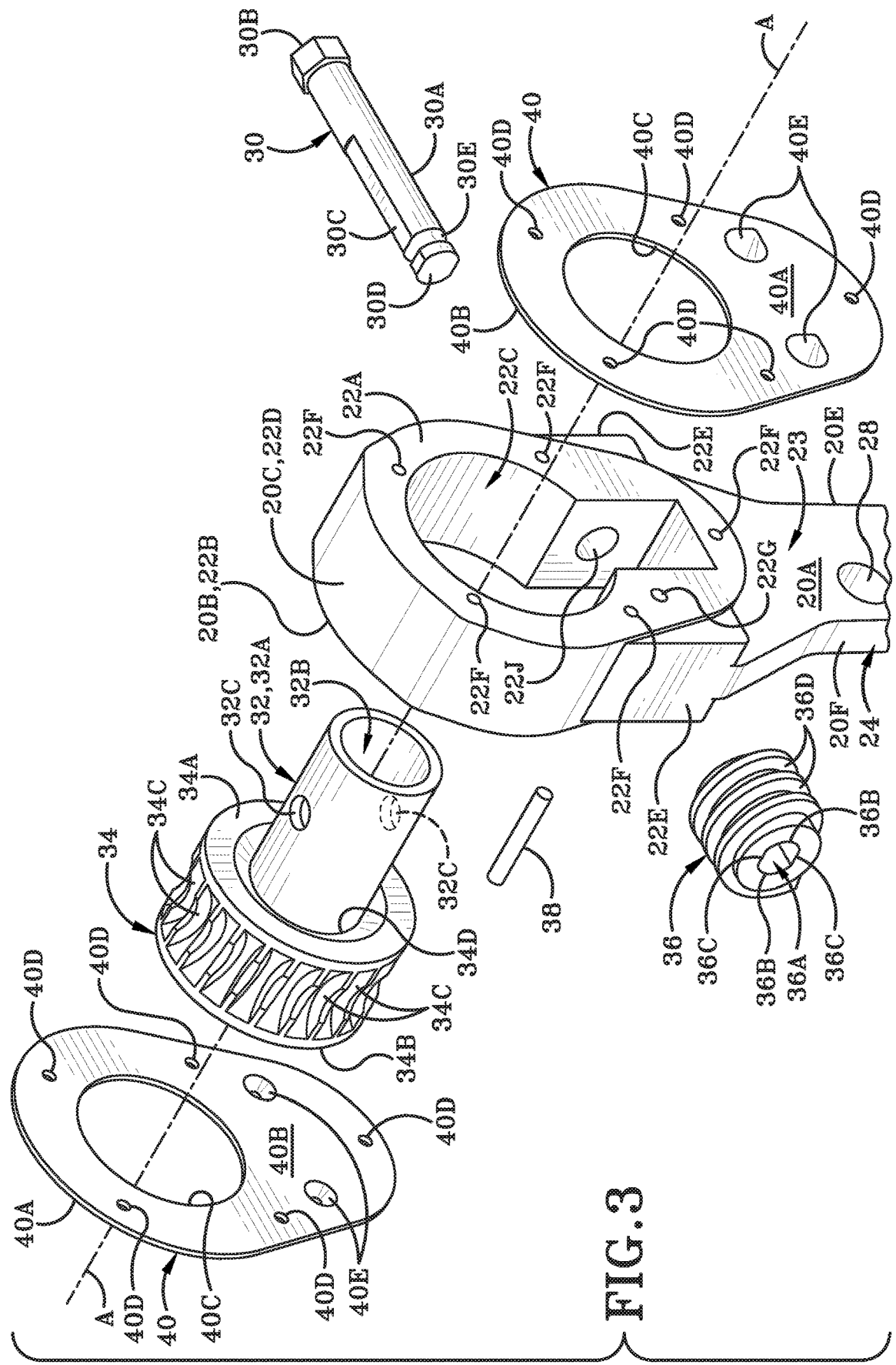
FIG. 3 is a partial exploded back perspective view of the exemplary tool.
Figure 4:
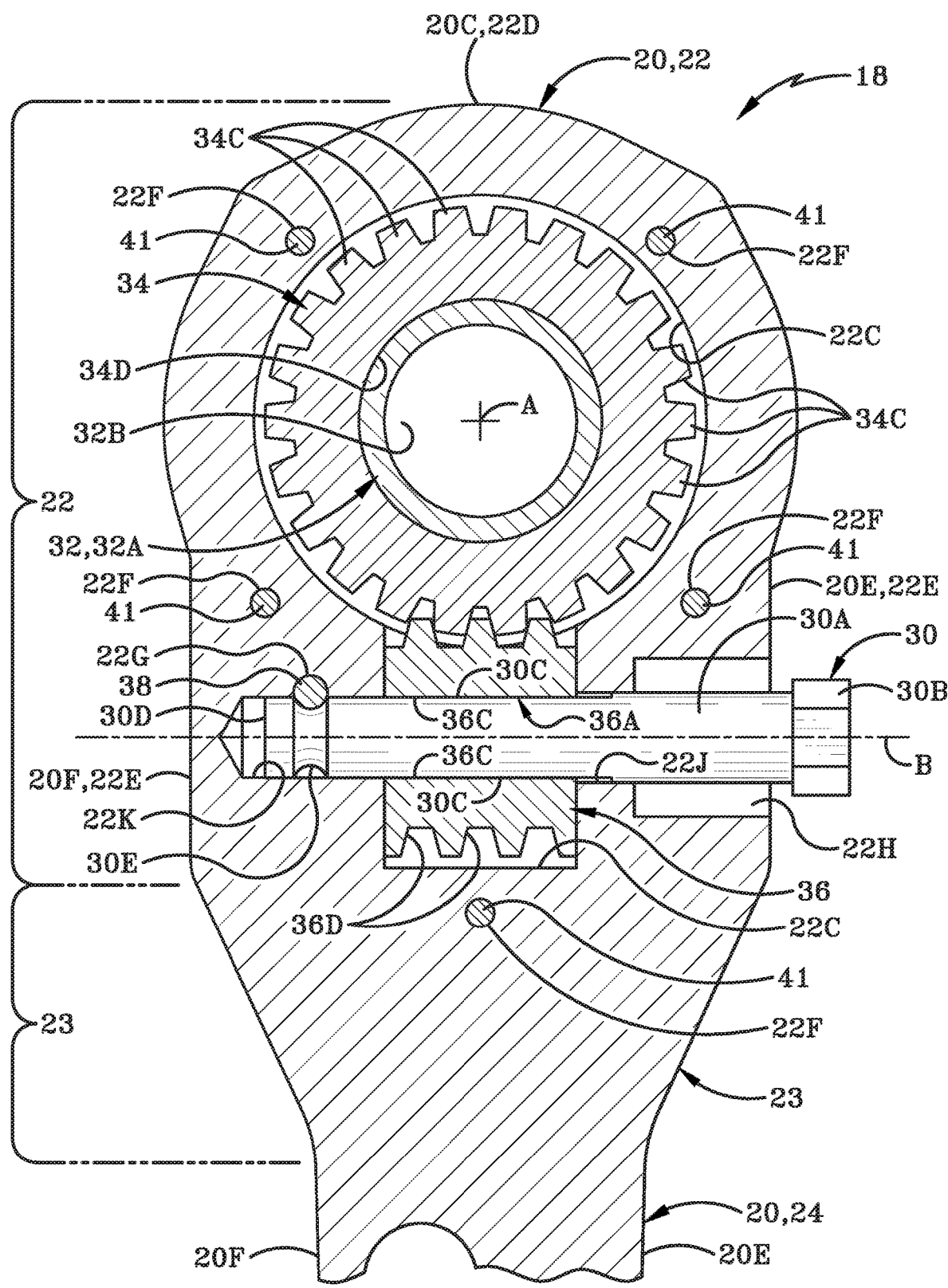
FIG. 4 is a cross-section of the exemplary tool taken along line 4-4 of FIG. 2.
Figure 5:
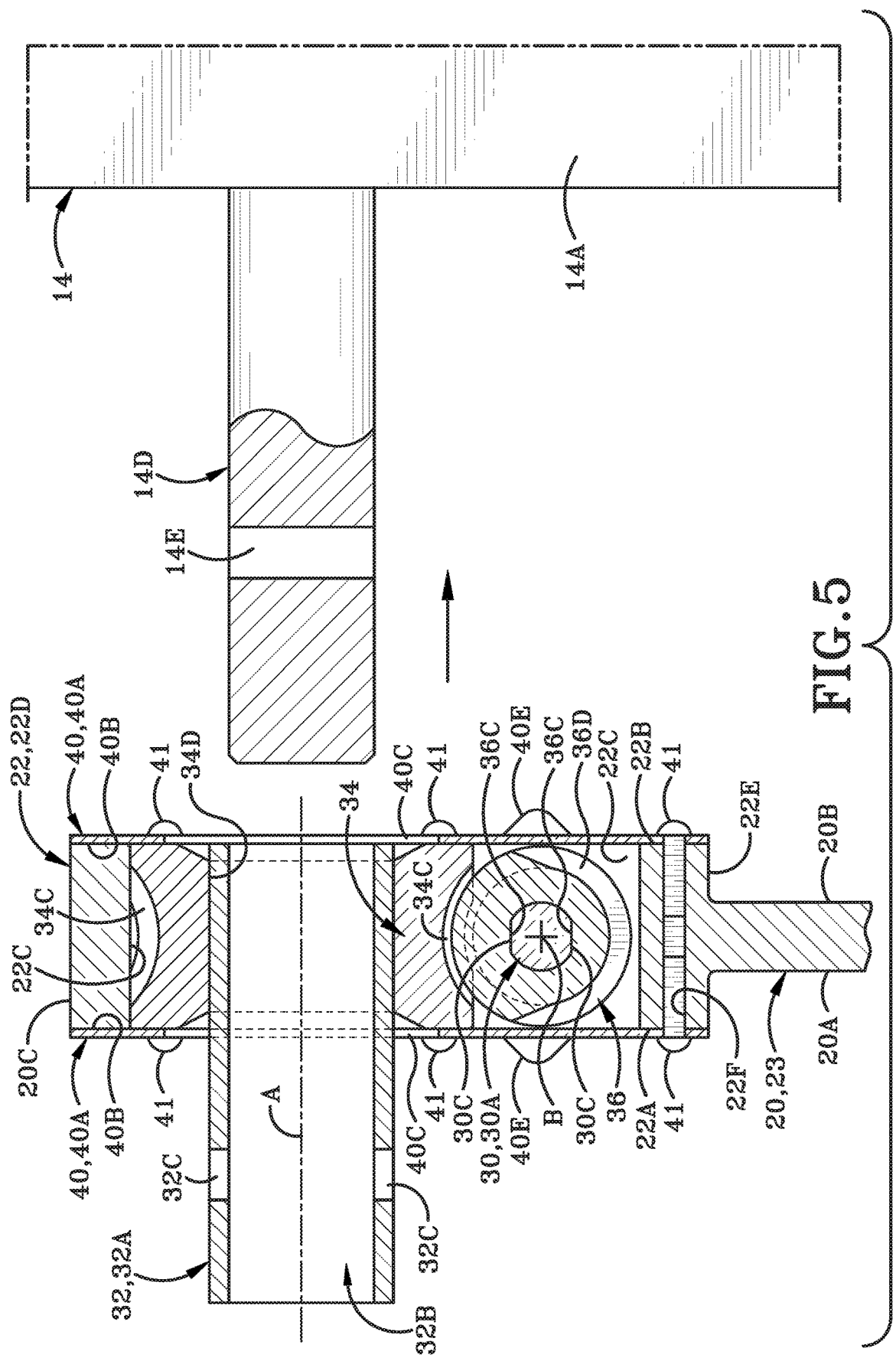
FIG. 5 is a cross-section of the exemplary tool taken along line 5-5 of FIG. 2, showing the center body and coupling engaged with each other and also shown exploded away from a trailer jack that is not illustrated in FIG. 2.

Head 22 has an upper generally circular region and a lower generally rectangular region that joins neck 23. Head 22 includes a front 22A and a back 22B that form part of front side 20A and back side 20B of center body 20. Front 22A and back 22B are both substantially planar (FIG. 5). A through-hole 22C is defined in head 22 and extends from the front 22A through to the back 22B. The through-hole 22C may be oriented along a longitudinal axis "A" (FIG. 3) of center body 20. Through-hole 22C may comprise a generally circular region that is located within the generally circular region of head 22, and a generally rectangular region that is located within the generally rectangular region of head 22. The generally circular region and generally rectangular regions of through-hole 22C are in communication with each other. In other words, through-hole 22C may be generally keyhole-shaped as is shown in FIG. 4.

Head 22 includes a curved upper surface 22D (FIG. 4) that forms the top 20C of center body 20. Head 22 also includes lower surfaces 22E extend downwardly from curved upper surface 22D and form the generally rectangular region of head 22. Lower surfaces 22E form part of the first side 20E and second side 20F and parts of the front side 20A and back side 20B of center body 20. The generally circular shape of the upper surface 22D of head 22 (as well as the rounded curve at bottom 20D of center body 20) helps to ensure that tool 18 does not include many surfaces that might accidentally damage trailer 10 or trailer jack 14 if they come into contact therewith.

Head 22 defines a plurality of holes 22F that extend between front 22A and back 22B. A pin-hole 22G also extends between front 22A and back 22B. As best seen in FIGS. 3 and 5, an aperture 22H is defined in head 22. Aperture 22H originates in lower surface 22E (i.e., in first side surface 20E) and extends toward the rectangular portion of through-hole 22C. FIG. 5 shows that first aperture 22H is connected via a first passageway 22J to through-hole 22C. A second passageway 22K extends from the rectangular region of through-hole 22C towards second side surface 20F. Second passageway 22K terminates a distance inwardly from second side surface 20F. First and second passageways 22J, 22K are substantially aligned with each other. As best seen in FIG. 4, pin-hole 22G is in communication with second passageway 22K (FIG. 4) is provided on head 22 in second passageway 22K.

Tool 18 also includes a worm shaft 30 (also referred to herein as a power coupling 30), a coupling device 32, a worm wheel 34, a worm 36, a retaining pin 38, and first and second covers 40. Worm shaft 30, worm 36, and worm wheel 34 together form a worm gear that is located mainly within the interior of center body 20. Only head 30A of worm shaft 30 extends outwardly from center body 20. It will be understood that first and second covers 40 may be substantially identical to each other but may be arranged as mirror images of each other when secured to head 22. All of these aforementioned components will be described below in greater detail.

The worm shaft 30 may comprise a shaft 30A that has a hexagonally-shaped head 30B provided at one end. A pair of opposed flat portions 30C may be provided on the shaft 30A a distance inwardly from the hexagonally-shaped head 30B. Shaft 30A terminates in an end 30D that is located a distance from head 30B. The worm shaft 30 may also define an annular groove 30E therein that is located a distance inwardly from end 30D. Groove 30E is located between end 30D and the flat portions 30C. A first region of shaft 30A located between flat portions 30C and head 30B may be generally cylindrical in cross-section. A second region of shaft 30A from flat portions 30C to end 30D may be generally elliptical in cross-section. The first region of shaft 30A may be received in aperture 22H while the second region of shaft 30A is received in first and second passageways 22J, 22K and extends across the rectangular portion of through-hole 22C. Groove 30E of shaft 30A is positioned to be aligned with through-hole 22G when worm shaft 30 is engaged with head 22, as will be described further herein.

The worm wheel 34 is configured to be received in the generally circular region of the through-hole 22C while worm 36 is configured to be received in the generally rectangular region of through-hole 22C. Coupling device 32 is configured to be engaged with worm wheel 34 and extend outwardly from through-hole 22C and generally parallel to axis "A".

Worm wheel 34 comprises a generally cylindrical body having a front surface 34A and an opposed back surface 34B. The worm wheel 34 body also includes an outer circumferential surface formed into a plurality of splines or teeth 34C that extend between front surface 34A and back surface 34B. Teeth 34C are oriented generally parallel to longitudinal axis "A". The worm wheel body also defines a central through-hole 34D that extends from front surface 34A through to back surface 34B. Through-hole 34D is therefore also oriented generally longitudinal axis "A" when worm wheel 34 is received in through-hole 22C.

FIG. 3 also shows that coupling device 32 is a generally tubular member having a peripheral wall 32A that is sized to be received in through-hole 34D of worm wheel 34. Peripheral wall 32A defines a bore 32B that extends from one end of peripheral wall 32A to the other. A pair of radially-aligned apertures 32C (FIG. 5) are defined in the wall of peripheral wall 32A and are in communication with bore 32B. The peripheral wall 32A of coupling device 32 is illustrated herein as being generally circular in shape so as to be complementary to the circularly-shaped through-hole 34D in worm wheel 34. It will be understood, however, that through-hole 34D and therefore the cross-sectional shape of peripheral wall 32A may be square, oblong, oval, or any other desired shape in order to engageably couple to a landing gear assembly, as will be later described herein.

Referring still to FIG. 3, the worm 36 may have a body that defines a central bore 36A that extends from one end of the worm 36 to the other. The bore 36A may be generally elliptical in shape including a pair of opposed flat surfaces 36B and a pair of opposed arcuate surfaces 36C. The worm 36 also may have an exterior surface that has a spiral groove 36D provided therein. Worm 36 may be positioned within the generally rectangular region of through-hole 22C of head 22. When so positioned, the bore 36A in worm 36 is aligned along transverse axis "B" (FIG. 4) with first and second passageways 22J, 22K. Worm shaft 30 is inserted through aperture 22H, through first passageway 22J, through the bore 36A of worm 36 and through second passageway 22K.

When worm shaft 30 is received in second passageway 22K, groove 30E in worm shaft 30 is brought into alignment with the smooth bore that extends into second passageway 22K. The smooth bore 22K is received in groove 30E. Retaining pin 38 is inserted through pin-hole 22G in head 22 and into groove 30E of worm shaft 30. Worm shaft 30 is therefore locked into head 22 and retaining pin 38. The spiral groove 36D on the exterior circumferential surface of worm 36 interlocks with splines (or teeth) 34C of worm wheel 34.

First and second covers 40 are secured to head 22 in order to cover and protect worm wheel 34, worm 36, and retaining pin 38. Each of the first and second covers 40 comprises a plate that has an exterior surface 40A and an interior surface 40B. Interior surface 40B is configured to be seated onto the associated one of the front 22A or back 22B of head 22. Each of the first and second covers 40 defines a through-hole 40C that extends between the exterior and interior surfaces 40A, 40B thereof. Through-hole 40C is positioned so as to be generally aligned with the circular portion of through-hole 22C of head 22. Through-hole 40C is smaller than the circular portion of the through-hole 22C. In particular, through-hole 40C is sized slightly larger than the exterior diameter of coupling device 32 and is positioned to receive coupling device 32 therethrough. Each of the first and second covers 40 defines a plurality of openings 40D therein that extend between the exterior and interior surfaces 40A, 40B. Openings 40D are positioned to be alignable with holes 22F in head 22. When first and second covers 40 are positioned onto front and back surfaces 22A, 22B of head 22, respectively, fasteners 41 are passed through the aligned openings 40D, 22F to secure first and second covers 40 to head 22. Spacers 40E may extend outwardly from the exterior surface 40A of each cover 40. Spacers 40E may be placed in contact with an exterior surface of trailer jack 14 to create a small space between tool 18 and trailer jack 14. This can be seen in FIG. 7.

Referring now to FIG. 4 and FIG. 5, cross-sections of head 22 of tool 18 are shown. The worm wheel 34 and worm 36 are located within central through-hole 22C of head 22 in such a manner that splines 34C extend outwardly from worm wheel 34 and engage in groove 36D of worm 36. Worm shaft 30 is anchored in head 22 by retaining pin 38 as described earlier herein. When worm shaft 30 is inserted through bore 36A of worm 36, flat portions 30C of worm shaft 30 are fittingly engaged with complementary flat surfaces 36C that define portions of the bore 36A of worm 36.

Coupling device 32 may be inserted into through-hole 34D of worm wheel 34 and thereby through central through-hole 22C of center body 20. Coupling device 32 is oriented along the axis "A". As illustrated in FIG. 3, worm wheel 34 and coupling device 32 may comprise a single member that is positioned in through-hole 22C.

In an alternative embodiment (not shown), teeth may be provided on an exterior circumferential surface of coupling device 32 and the innermost ends of the splines provided on worm wheel 34 may be provided with interior teeth that extend into the through-hole 34D defined in worm wheel 34. In this alternative embodiment, the teeth on the exterior circumferential surface of coupling device 32 may interlockingly engaged with the interior teeth on the splines of the worm wheel 34.

Referring now to FIG. 6 and FIG. 7, tool 18 may be engaged with trailer jack 14, particularly with the projection 14D that may be operatively engaged with a gear mechanism within trailer jack 14 and which is utilized to lower or raise leg 14B relative to body 14A.

The projection 14D of the trailer jack 14 may be received through the bore 32B of the coupling device 32. A locking pin 44 secures coupling device 32 to projection 14D. The locking pin 44 may comprise a bolt that has a shaft 44A with a head 44B at one end. A second end 44C of locking pin 44 is inserted through the aperture 32C of the coupling device 32, through the aperture 14E defined in the projection 14D of the trailer jack 14. A nut 44D may be engaged with shaft 44A to lock locking pin 44 in place. Consequently, if coupling device 32 rotates, projection 14D will rotate in unison therewith. Instead of locking pin 44 being a bolt and a nut 44D being used to secure the bolt in place, locking pin 44 may instead be any other type of fastening device such as a clevis pin or cotter pin.

Prior to rotating the power coupling 32, the tool 18 may optionally be locked to a trailer jack by engaging the locking mechanism 42 on the trailer jack 14 to the tool 18 via the locking aperture 26. The engaged locking mechanism 42 is put through the locking aperture 26, fixing the tool to an exemplary trailer jack 14 as shown. Locking mechanism 42 includes an engageable arm 42A with a first end 42B and second end 42C terminating in cap 42D. The first end 42B of the engageable arm 42A of the locking mechanism 42 is operative to pass through the locking aperture 26 in order to prevent movement of the lower portion of tool 18. The locking mechanism 42 has a spring assembly 42E with a stop 42F located at one end of the locking mechanism body 42G. The locking mechanism body 42G is generally flat on a side so that it may be placed flat against a trailer jack 14. Locking mechanism body 42G may be attached to a trailer jack 14 or held by rotating the second end 42C of the engageable arm 42A.

Figure 8A:
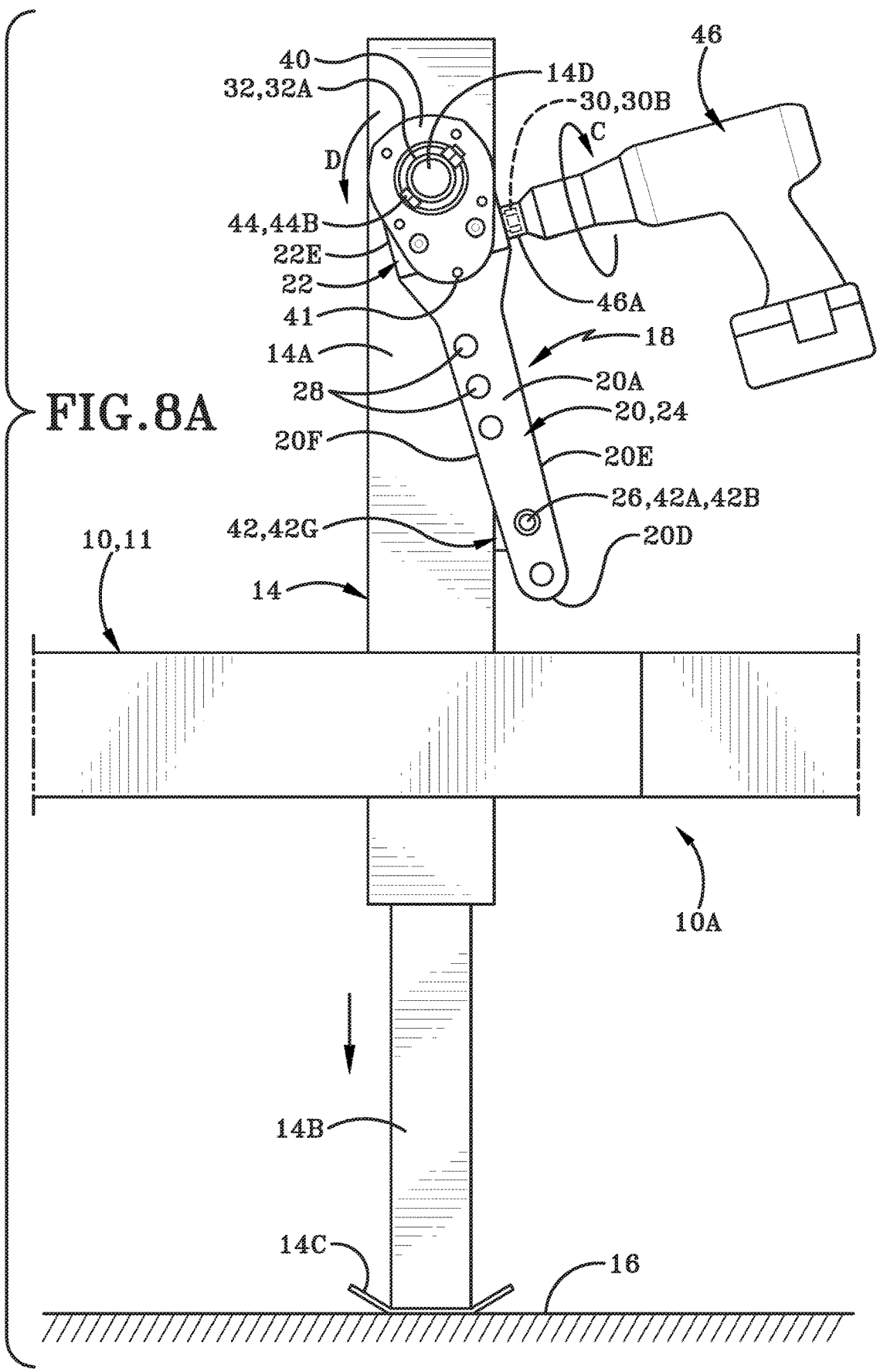
FIG. 8A is a front elevation view of the tool engaged with the body of the trailer jack and showing a power drill engaged with the tool and being operated to lower a leg member of the trailer jack toward the ground.
Figure 8B:
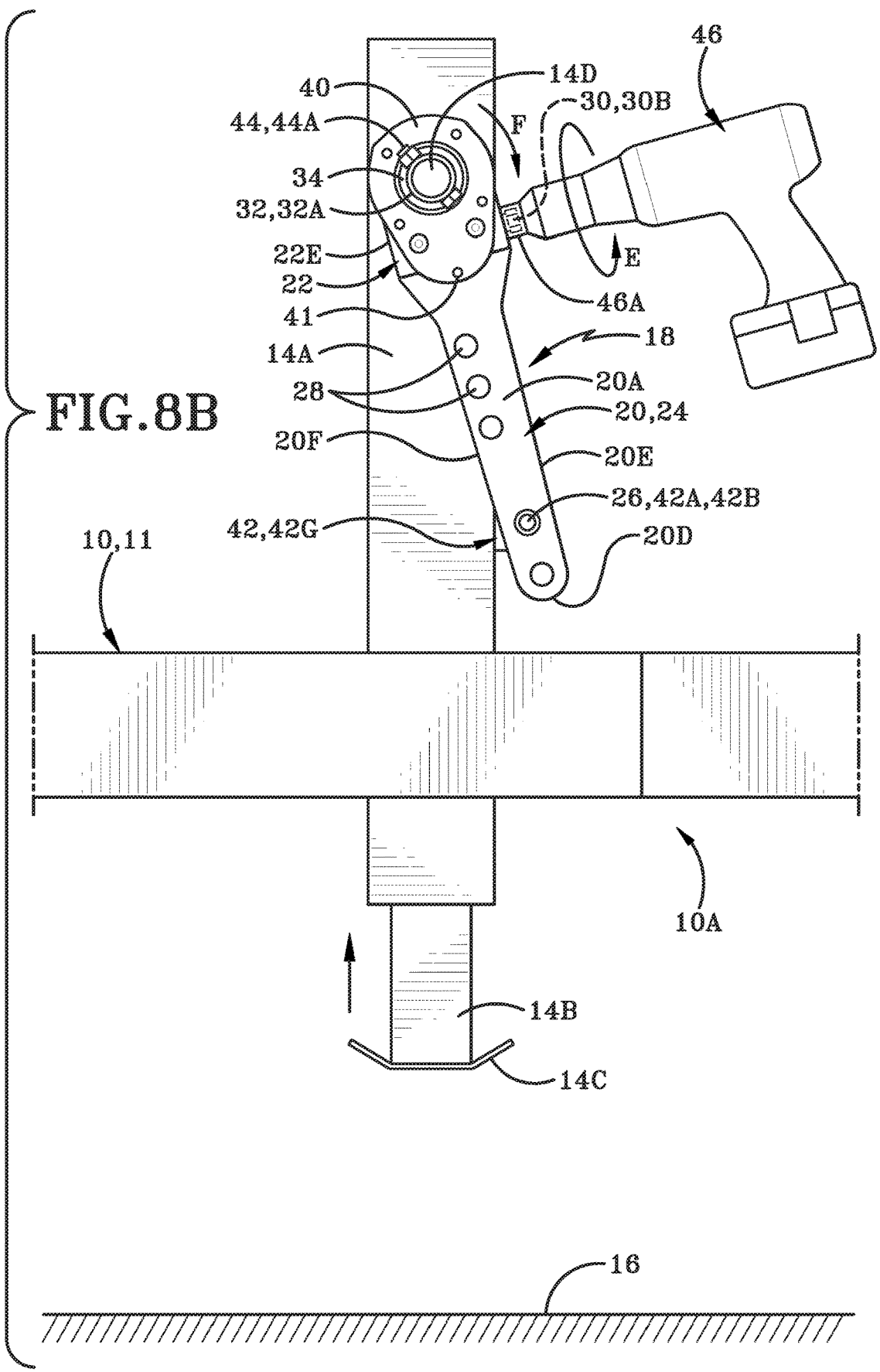
FIG. 8B is a front elevation view of the tool engaged with the body of the trailer jack and showing the power drill engaged with the tool and being operated to raise the leg member.

Referring now to FIG. 8A and FIG. 8B shows operation of tool 18 by use of an external power source. This external power source may be, for example, a hand-held powered drill 46. A power source may be engaged with the hexagonally-shaped head 30B of tool 18. For example, a socket on a chuck 46A (FIG. 8A) of powered drill 46 may be engaged with the of worm shaft 30 as described earlier herein. The socket on chuck 46A is shaped, sized, and configured to be complementary to the head 30B of worm shaft 30 and to interlockingly engage the same such that when chuck 46A is rotated, worm shaft 30 is caused to rotate in unison with chuck 46A. Powered drill 46 may then be selectively actuated to rotate worm shaft 30 in a first direction "C". As soon as powered drill 46 begins to rotate worm shaft 30, the rotational motion tends to be transferred to center body 20 and thereby to lever coupling device 32. Because tool 18 has been secured against rotation (see FIG. 7), most motion of tool 18 may be substantially prevented. The securing of tool 18 against rotation thereby tends to prevent an operator from being hit by a rotating tool 18. Motion imparted by powered drill 46 rotates the worm shaft 30 about axis "B".

As illustrated in FIG. 8A and FIG. 8B, powered drill 46 may be operated to rotate worm shaft 30 in a first direction "C". As worm shaft 30 rotates about axis "B", worm 36 engaged on worm shaft 30 may be, in turn, rotated about the axis "B" in unison with shaft 30A. Consequently, worm 36 may be also rotated in a direction "C". Worm 36 in turn rotates worm wheel 34 around longitudinal axis "A". Rotation of worm wheel 34 occurs in a first rotation direction "D" because of the interlocking engagement of the outer teeth 34A of worm wheel 34 and groove 36D of worm 36. Inner teeth 36B of the splines 34C (if provided) of worm wheel 34 engage the exterior of coupling device 32 and therefore first rotation direction "D" of the coupling device 32 may be initiated. Alternatively, as shown coupling device 32 is welded to worm wheel 34, when worm wheel 34 is rotated by worm 36, then coupling device 32 will rotate in unison with worm wheel 34 in the first rotation direction "D".

As shown in FIG. 8A, when desired to lower the leg member 14B of the trailer jack 14, the powered drill 46 attaches to the head of the worm shaft 30B rotates in the first direction "C", the socket rotates the worm shaft 30 and thereby worm 36 and thereby worm wheel 34 and thereby coupling device 32 allowing leg member 14B to move downwardly out of the body 14A toward the ground surface 16 until the leg member foot 14C makes contact with the surface 16.

The tool may be engaged with a trailer jack assembly 14 via a coupling device 32 within tool 18 mating with the trailer jack assembly 14. Tool 18 may be operative to engage the trailer jack assembly 14. In an exemplary embodiment when tool 18 is driven via a powered drill 46 which is attached to the head worm shaft 30 of tool 18, the leg member 14B is operative to move towards a ground surface 16 out the body 14A to allow the leg member foot 14C to make contact with a ground surface 16, when the worm shaft 30 is being rotated in a first direction.

If, on the other hand, as shown in FIG. 8B, it is desired to raise the leg member 14B, the powered drill 46 attaches to the worm shaft 30 and rotates in the second direction "E". Consequently, the direction of rotation is reversed in the direction of a second direction "E" with respect to the socket which rotates the worm shaft 30 and thereby worm 36 and thereby worm wheel 34 and thereby coupling device 32 in a second direction of rotation "F" allowing leg member 14B to move upwardly back into the body of the trailer jack 14A away from the ground surface 16 until the leg member 14B is fully retracted into the body 14A.

In the exemplary embodiment, the trailer 10 is disconnected from the vehicle 12 and tool 18 is attached to a projection for a landing gear assembly in a retracted form where the leg 14B is within the body 14A of the trailer jack 14 on the trailer 10. The tool 18 is then locked into place by use of a locking mechanism 42 to prevent tool 18 from rotating. A drill 46, or other power source including a hand powered wrench or other mechanism for turning, is attached to the head of the worm shaft 30B. The drill 46, or other powering mechanism is powered in a first direction "C". The first direction rotation of the drill 46 engages the worm shaft 30, which moves the worm 36 which causes the worm wheel 34 to rotate and move the coupling device 32, which engages trailer jack 14 and is operative to extend the leg 14B out of the body 14A of the trailer jack 14 towards a ground surface 16. When the foot 14C of the leg 14B makes contact with the ground and is sufficiently secured to the ground, the rotation of the drill 46 stops. Then, when it is desired to move the trailer 10, the powered drill 46 is operate to move in a second direction which engages the worm shaft 30, which moves the worm 36 which causes the worm wheel 34 to rotate and move the coupling device 32, which engages trailer jack 14 and is operative to retract the leg 14B relative to the ground surface 16. Once the leg 14B is at a desired level of retraction, the trailer 10 may be reattached to the vehicle 12 and moved away.

Figure 9:
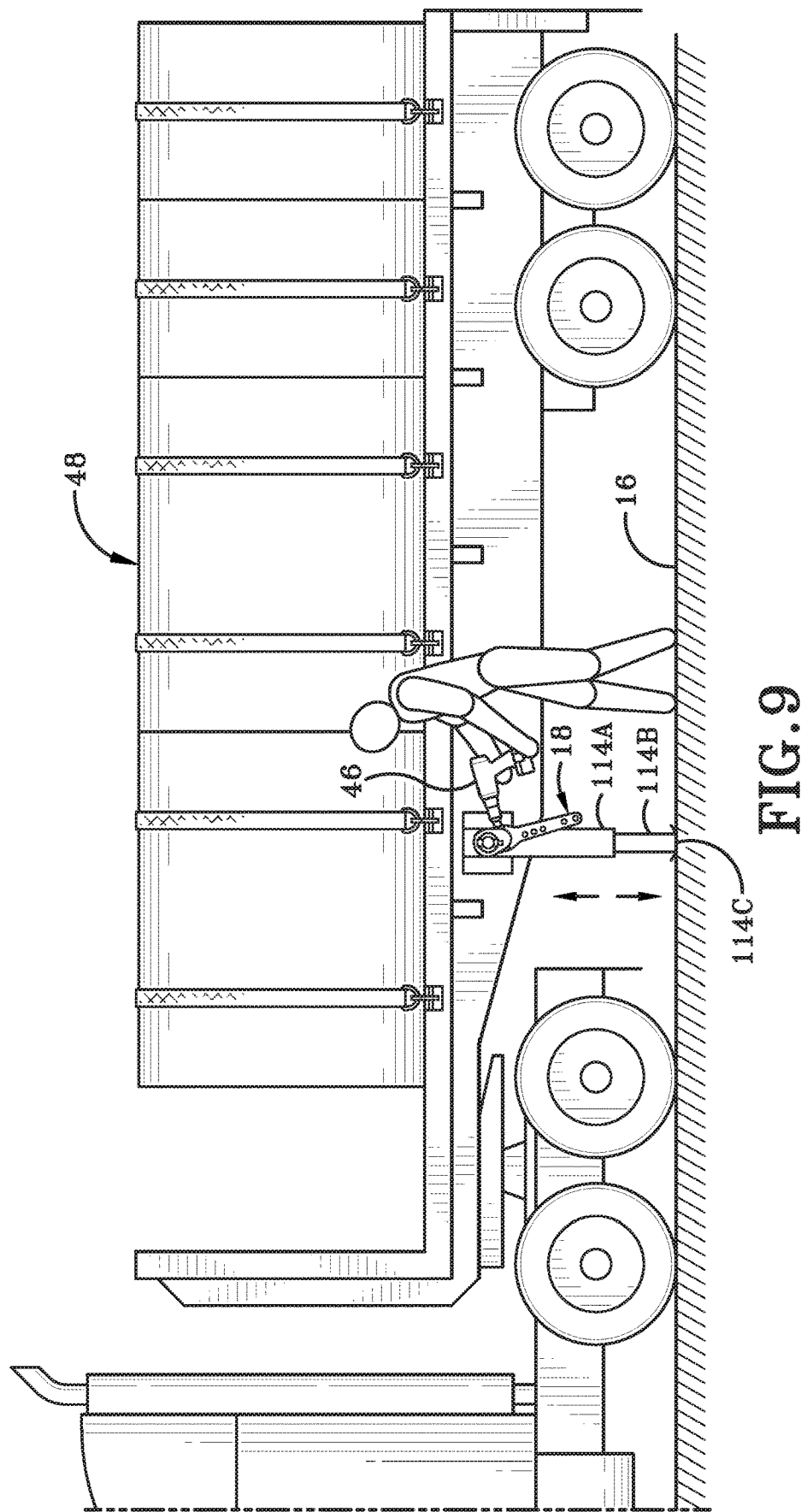
FIG. 9 shows a front elevation view showing the tool of FIG. 2 being utilized to raise or lower the landing gear of a tractor-trailer.

As shown in FIG. 9, tool 18 may also be used to lower and raise the landing gear 114 of a semi-truck 48. The semi-truck landing gear 114 includes a first region 114A that is fixedly engaged with the frame of the semi-truck 48. A leg 114B of the landing gear 114 may be extended outwardly from the first region 114A until a foot 114C (or the bottom end of the leg 114B) contacts the ground surface 16. Tool 18 may be engaged with a projection (not shown) on landing gear 114 that is substantially similar or identical in structure and/or function to projection 14D. A power source, such as a hand-held drill 46, is coupled with the power coupling 30 on tool 18 and when the drill 46 is actuated the power coupling on the tool 18 is caused to rotate in a selected one of the first rotational direction and the second rotational direction as has been described earlier herein. Tool 18 is therefore utilized to lower or raise landing gear 114 in much the same fashion as tool 18 is able to lower or raise landing gear 14.

While rotation has been identified as occurring in the directions "C", "D", "E" and "F", it will be understood by one of ordinary skill in the art that the particular component may, in another examples, be caused to rotate in the opposite direction from that indicated in the drawings.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively presented in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An apparatus for lowering and raising a landing gear on a truck or trailer comprising:
   a center body;
   a coupling device extending outwardly from a front side of the center body; said coupling device being adapted to engage a projection on a landing gear; wherein the coupling device is a tubular member having a peripheral wall that bounds and defines a bore; and wherein the bore is adapted to receive the projection from the landing gear therein; and
   a power coupling provided on the center body, said power coupling being operatively engaged with the coupling device;
      wherein the power coupling is adapted to couple to an external power source; and
      wherein operation of the power source rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear.

2. The apparatus as defined in claim 1, wherein the power coupling comprises a shaft having a head at one end; and wherein the head is adapted to be engaged by the external power source.

3. The apparatus as defined in claim 2, further comprising a worm provided on the shaft.

4. The apparatus as defined in claim 3, wherein the center body defines a central through-hole; and the worm is located in the central through-hole.

5. The apparatus as defined in claim 4, wherein the center body defines an opening that extends from an exterior surface of the center body to the central through-hole; and wherein the shaft extends through the opening and into the worm disposed in the central through-hole; and wherein the head is located adjacent the exterior surface of the center body.

6. The apparatus as defined in claim 3, further comprising a worm wheel on the center body; said worm wheel being operatively engaged with the worm; and wherein rotation of the worm causes rotation of the worm wheel.

7. The apparatus as defined in claim 6, wherein the worm wheel is operatively engaged with the coupling device and rotation of the worm wheel causes rotation of the coupling device.

8. The apparatus as defined in claim 7, wherein the coupling device is rotated in unison with the worm wheel.

9. The apparatus as defined in claim 1, wherein the peripheral wall defines a pair of opposed apertures therein and the pair of apertures is in communication with the bore; and wherein the apparatus further comprises a locking pin that is receivable through the pair of apertures and is adapted to further be received through aligned openings defined in the projection extending from the landing gear and thereby secure the coupling device to the projection.

10. An apparatus for lowering and raising a landing gear on a truck or trailer comprising:
a center body;
a coupling device extending outwardly from a front side of the center body; said coupling device being adapted to engage a projection on a landing gear; and
a power coupling provided on the center body, said power coupling being operatively engaged with the coupling device;
wherein the power coupling is adapted to couple to an external power source; and
wherein operation of the power source rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear; and
a locking aperture defined on the center body, said locking aperture being adapted to engage a locking mechanism on the landing gear; and when the locking aperture is engaged with the locking mechanism, the center body is locked in position relative to the landing gear.

11. In combination,
a hand-held drill; and
an apparatus for lowering and raising a landing gear on a truck or trailer, wherein the apparatus comprises:
a center body;
a coupling device extending outwardly from a front side of the center body; said coupling device being adapted to engage a projection on a landing gear; a locking aperture defined on the center body, said locking aperture being adapted to engage a locking mechanism on the landing gear; and when the locking aperture is engaged with the locking mechanism and the hand-held drill is operated, the center body is locked in position relative to the landing gear; and
a power coupling provided on the center body, said power coupling being operatively engaged with the coupling device;
wherein the power coupling is coupled to the hand-held drill; and
wherein operation of the drill rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear.

12. The combination as defined in claim 11, wherein the hand-held drill includes a socket driver that is selectively engaged with the power coupling.

13. A method of raising and lowering a trailer or semi-truck landing gear said method comprising steps of:
providing a tool having a center body, a coupling device extending from the center body, and a power coupling provided on the center body;
attaching the coupling device to a projection on a trailer landing gear;
engaging the power coupling to an external power source;
actuating the external power source;
rotating the power coupling in one of a first direction and a second direction;
rotating the coupling device in response to rotating the power coupling; and
lowering the landing gear when the power coupling is rotated in the first direction and raising the landing gear when the power coupling is rotated in the second direction.

14. The method as defined in claim 13, further comprising:
locking the center body to a portion of the landing gear; and
preventing rotation of the center body relative to the portion of the landing gear while rotating the power coupling in the one of the first direction and the second direction.

15. The method as defined in claim 14, wherein the step of locking comprises: engaging a locking mechanism on the landing gear in a locking aperture located provided on the center body.

16. The method as defined in claim 15, wherein the step of engaging the locking mechanism further comprises:
inserting a first end of a spring-loaded arm of the locking mechanism through the locking aperture.

17. The method as defined in claim 13, wherein the steps of engaging the power coupling to the external power source and actuating the power source further comprise:
engaging a socket on the external power source about a head of a shaft of the power coupling;
engaging a worm located in the center body about the shaft of the power coupling;
rotating the shaft of the power coupling with the socket; and
rotating the worm in unison with the shaft.

18. The method as defined in claim 17, further comprising:
engaging the worm with a worm wheel located within the center body; and rotating the worm wheel in response to rotation of the worm; and rotating the coupling device in response to rotation of the worm wheel.

19. In combination, a hand-held drill; and an apparatus for lowering and raising a landing gear on a truck or trailer, wherein the apparatus comprises:
- a center body;
- a coupling device extending outwardly from a front side of the center body; said coupling device being adapted to engage a projection on a landing gear; wherein the coupling device is a tubular member having a peripheral wall that bounds and defines a bore; and wherein the bore is adapted to receive the projection from the landing gear therein; and
- a power coupling provided on the center body, said power coupling being operatively engaged with the coupling device;
    - wherein the power coupling is coupled to the hand-held drill; and
    - wherein operation of the drill rotates the power coupling in one of a first direction and a second direction; and rotation of the power coupling in the first direction causes the coupling device to move the projection in a first manner and lower the landing gear; and rotation of the power coupling in the second direction causes the coupling device to move the projection in a second manner and raise the landing gear.

\* \* \* \* \*